March 28, 1961 J. R. CAMPBELL 2,977,451
MULTI-STAGE HEATING ELEMENT CONTROL
Filed Feb. 7, 1956 3 Sheets-Sheet 1
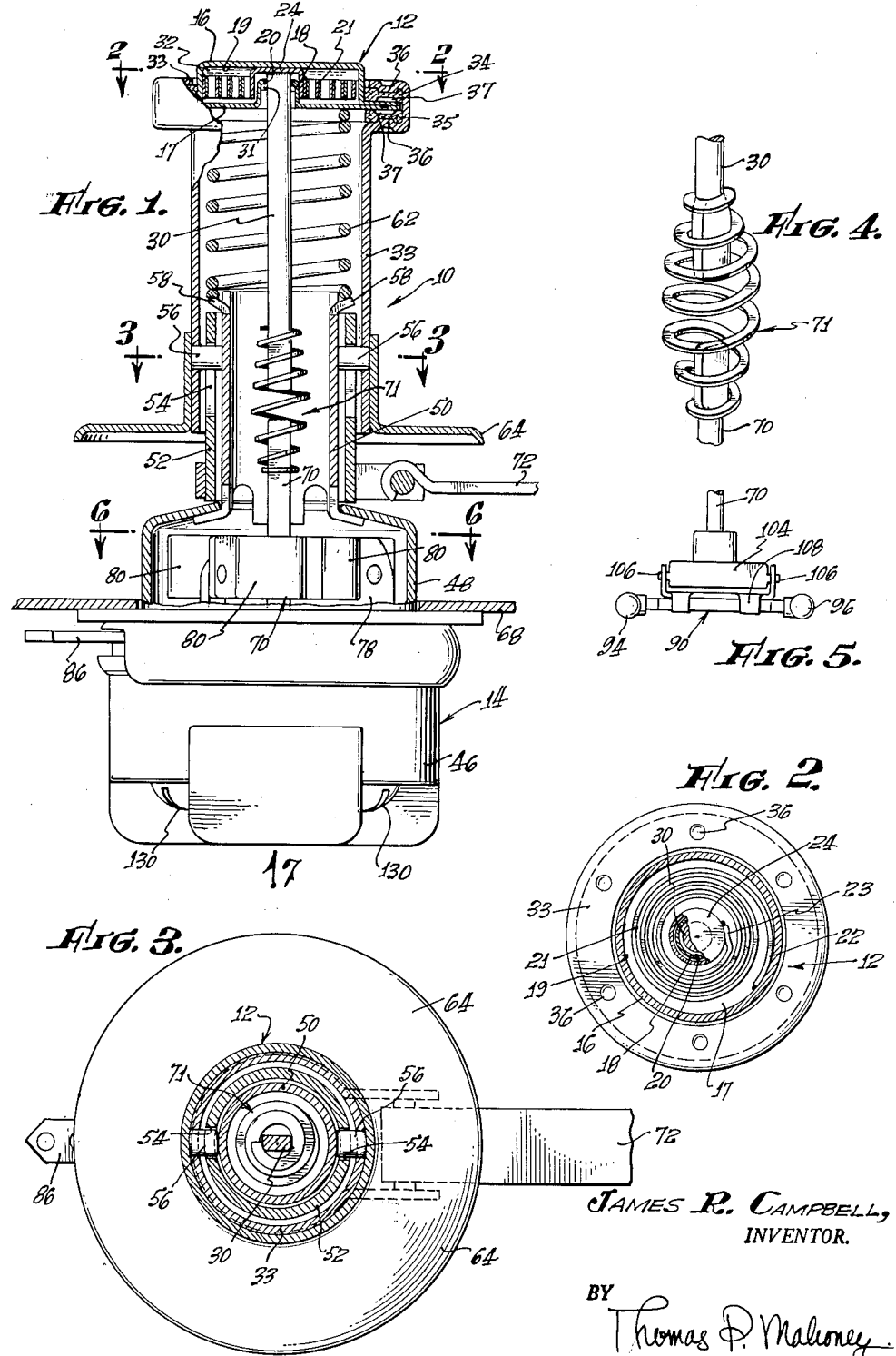
JAMES R. CAMPBELL,
INVENTOR.
BY Thomas P. Maloney
ATTORNEY.

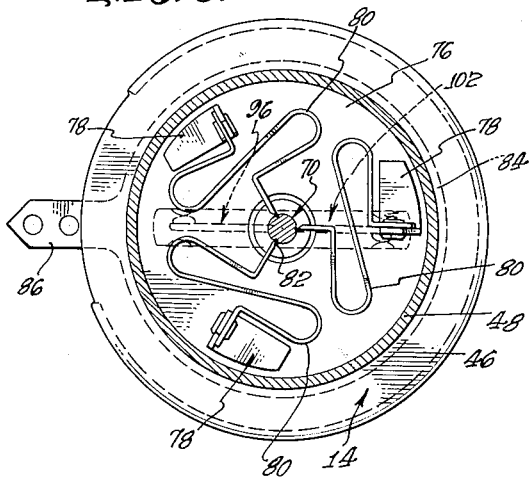
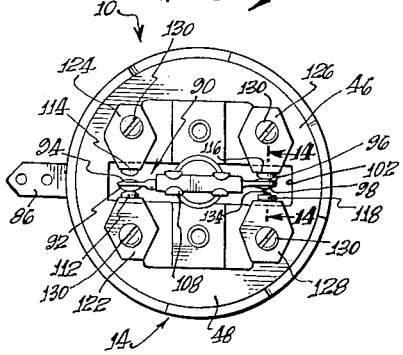
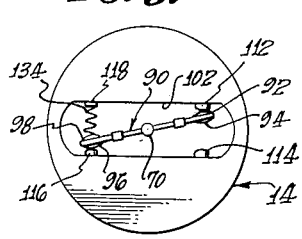
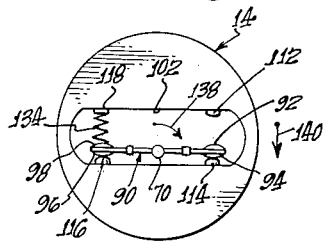
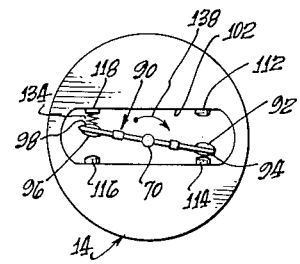
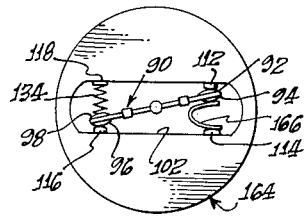
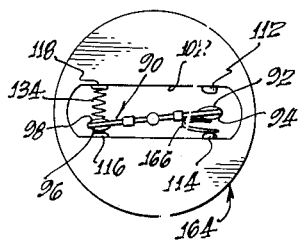
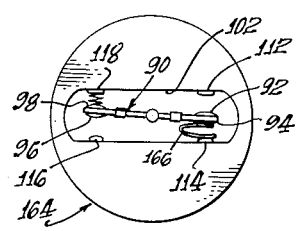
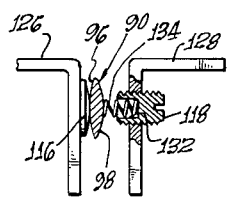

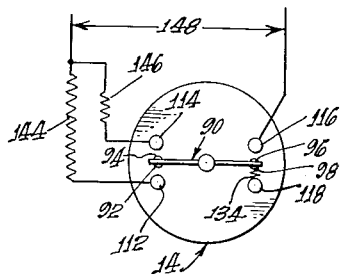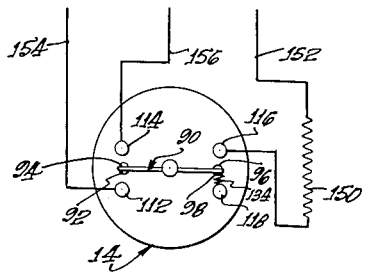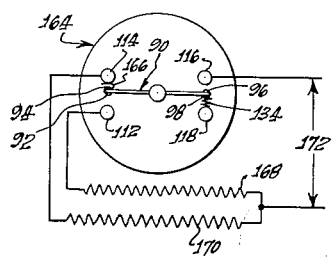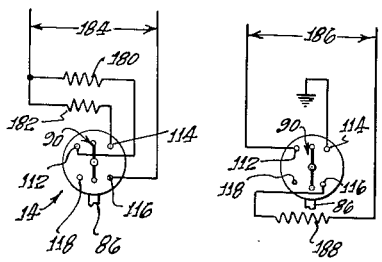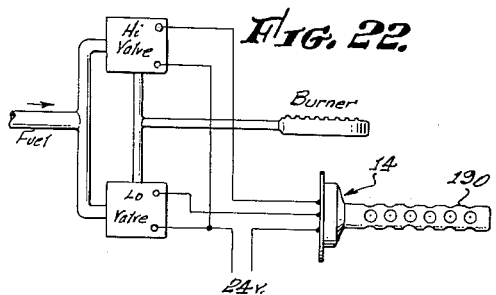

United States Patent Office 2,977,451
Patented Mar. 28, 1961

2,977,451
MULTI-STAGE HEATING ELEMENT CONTROL

James R. Campbell, 1504 Carmelita St.,
Laguna Beach, Calif.

Filed Feb. 7, 1956, Ser. No. 563,884

6 Claims. (Cl. 219—20)

This invention relates to an electrical control circuit of the character wherein two-stage operation of the circuit is desired and has particular application in the two-stage control of such domestic appliances as electrical water heaters, electrical stove burners, blower fans associated with various types of heating systems, and the two-stage supply of fuel to the burners of such heating systems.

The list of applications of the two-stage electrical control circuit is not intended to be exhaustive since, as will be apparent from a consideration of the invention, the applications thereof are numerous.

In essence, the electrical control circuit of my invention includes a temperature sensing element which is operatively connected to a unique, single-pole, triple-throw switch responsive to a signal generated by the temperature sensing element, said switch, in turn, being provided with a plurality of contacts which are connected to the terminals of a two-stage heating system, or other typical two-stage electrical circuits.

In order to illustrate the construction and mode of operation of an electrical control circuit embodying the principles of my invention, reference will be had hereinbelow to an electrical control circuit for the top heating element of an electrical cooking stove, but it is not intended that the invention be limited to this specific application and illustrations will be presented of the application of the control circuit to electrical water heaters, blower control circuits, and fuel burner control circuits to illustrate the facility with which the invention may be applied to different types of appliances and in different types of environments where the necessity for automatic, two-stage control is indicated.

It is, therefore, an object of my invention to provide a multi-stage control circuit of the aforementioned character adapted particularly for use in controlling automatically the temperature of an electrical heating element in an electric stove, said control circuit including a temperature sensing element which is movable into contact with a cooking pot or other container placed upon said heating element and said sensing element being operatively connected to a single-pole, triple-throw switch including a plurality of contacts connected in the heating element circuits whereby said heating element circuits will be controlled in response to signals delivered to said switch by said temperature sensing element.

Another object of my invention is the provision, in a control circuit of the aforementioned character, of a single-pole, triple-throw switch which includes a plurality of contacts connected to the heating circuits of a heating element and which includes a contact bar which is movable in first and second senses by first and second actuating means to cause said contact bar to engage desired pairs of said contacts to maintain the electrical heating element at a desired temperature.

Another object of my invention is the provision of a single-pole, triple-throw switch of the aforementioned character wherein the first and second means for accomplishing the movement of the contact bar of the switch in said first and second senses are constituted by spring means adapted to bias said contact bar into engagement with selected pairs of said contacts to accomplish the maintenance of the heating element circuits at a desired temperature.

An additional object of my invention is the provision of a temperature sensing element which includes a bimetallic member located in a liquid-tight housing, said member being immersed in a body of heat conductive fluid whereby the temperature of an object with which the housing of the sensing element is in heat transfer relationship is uniformly and substantially instantaneously distributed throughout the bimetallic element.

Therefore, when temperature changes occur in the object resting on the electrical heating element and on the temperature sensing element, they are rapidly communicated to the bimetallic member which, in turn, is caused to function appropriately to deliver a signal to the triple-throw, single-pole switch.

The single-pole, triple-throw switch of my invention is characterized by the fact that it includes a contact bar which is mounted for movement in two senses and which has means associated therewith for accomplishing said movement. In the particular embodiment of the single-pole, triple-throw switch disclosed herein, the contact bar is mounted for rotary movement on the upper end of an actuating shaft, said shaft being connected to first means for accomplishing rotation of said contact bar between opposite limits of movement. Second means is provided for causing movement of the contact bar in a direction normal to the axis of the aforesaid actuating shaft between first and second positions and there is thus obtained a unique pattern of movement of the contact bar which permits the bar to be utilized as a triple-throw contact bar in a single-pole switch.

The flexibility of the control and the simplicity of installation achieved by the use of the single-pole, triple-throw switch of my invention facilitates its use in the multi-stage electrical control circuits in which it is incorporated.

The single-pole, triple-throw control device or switch of my invention embodies certain of the structures disclosed in my United States Letters Patent No. 2,394,747, and reference will be made occasionally to said patent herein in order to avoid the disclosure of structure which has been previously disclosed in said patent.

Other objects and advantages of my invention will be apparent from the following specification and the accompanying drawings which are for the purpose of illustration only and in which:

Fig. 1 is a vertical, sectional view of a portion of a temperature control utilized for controlling the temperature of a heating element of a cooking stove;

Fig. 2 is a transverse, sectional view taken on the broken line 2—2 of Fig. 1;

Fig. 3 is a transverse, sectional view taken on the broken line 3—3 of Fig. 1;

Fig. 4 is a fragmentary view showing the operative connection between the temperature sensing element and the single-pole, triple-throw switch associated therewith;

Fig. 5 is a side elevational view of the contact bar of the single-pole, triple-throw switch and the mounting therefor;

Fig. 6 is a transverse, sectional view taken on the broken line 6—6 of Fig. 1;

Fig. 7 is a bottom plan view taken from the direction of the arrow 7 of Fig. 1 and showing the single-pole, triple-throw switch of my invention;

Fig. 8 is a schematic view showing the contact bar of the switch of my invention in normally closed position upon the pair of normally closed contacts of said switch;

Fig. 9 is a view similar to Fig. 8 showing the contact bar located in an intermediate position;

Fig. 10 is a view similar to Fig. 9 showing the contact bar located in the position in which it will render the switch inoperative and open all of the circuits in which the switch is connected;

Fig. 11 is a schematic view of an alternative embodiment of the single-pole, triple-throw switch showing said switch in normally closed position;

Fig. 12 is a view similar to Fig. 11 showing the switch with the contact bar disposed in an intermediate position;

Fig. 13 is a view showing the contact bar of the switch of Fig. 11 in open position;

Fig. 14 is an enlarged, fragmentary view taken on the broken line 14—14 of Fig. 7;

Fig. 15 is a circuit diagram showing the single-pole, triple-throw switch connected to the electrical heating elements of a burner for an electrical stove;

Fig. 16 is a view of another heating element circuit in which the single-pole, triple throw switch can be connected;

Fig. 17 is a circuit diagram showing the connection of the alternative embodiment of the single-pole, triple-throw switch shown in Fig. 11 to a two-stage, top burner circuit;

Fig. 18 is a circuit diagram showing the use of the alternative embodiment shown in Fig. 11 to control a three-stage top burner;

Fig. 19 is a circuit diagram showing the application of the triple-throw switch of my invention to an electrical heating circuit for an electrical water heater;

Fig. 20 is a circuit diagram showing the application of the switch of my invention in a heating circuit for an electrical water heater;

Fig. 21 shows the use of the switch of my invention as a two-stage control for a blower fan in a heating furnace; and Fig. 22 shows the application of the switch of my invention to the two-stage control of a burner for a furnace.

Referring to the drawings and particularly to Figs. 1-16 thereof, I show a control 10 adapted to be located centrally of an electrical heating element of the conventional type customarily used in electric ranges, said control including a temperature sensing pickup or element 12 which is operatively connected, in a manner to be described in greater detail below, to a control switch 14 of my invention.

The pickup 12 includes a cup 16 formed from stainless steel, or the like, and closed at its lower extremity by a bottom plate 17 whose peripheral edge is welded to a flange on the cup 16. The bottom plate 17 is provided with a centrally located boss 18 which extends upwardly into the chamber 19 defined by the cup 16 and which has a centrally located opening 20 therein.

Located in the chamber 19 is a temperature-responsive, bimetallic element 21, said element, in the present embodiment of the invention, being of spiral configuration and having its outermost end 22 secured, as by means of welding, to the vertical wall of the cup 16. The inner extremity 23 of the bimetallic element 21 is fastened to an inverted cap 24 which overlies the boss 18 and which is secured to the upper extremity of a shaft 30 and rotation of the shaft 30 will be caused by contraction or expansion of the bimetallic element 21 to operate the control switch 14, in a manner to be described in greater detail below.

The shaft 30 depends through the centrally located opening 20 in the bottom of the boss 18 and a "silastic" washer 31 serves to seal said opening and to resist the intense heat to which the pickup 12 is subjected. In order to insure instantaneous transmittal and conduction of heat throughout the bimetallic element 21, the chamber 19 of the pickup 12 incorporates a bath 32 of mercury, or similar fluid having excelelnt heat-conductive characteristics, so that, as the temperature of a cooking pot or the like against which the top of the pickup 12 is engaged increases or decreases, an immediate response to such increase or decrease will be transmitted to the entire length of the bimetallic element 21 so that a substantially simultaneous signal will be generated thereby and transmitted to the shaft 30 to insure substantially concomitant operation of the switch 14 with which the pickup 12 is associated.

The pickup 12 is mounted in the upper end of a vertically oriented, elongated sleeve 33 whose upper extremity is spun about an upper asbestos gasket 34 mounted on the flange of the cup 16 and a lower gasket 35 which underlies the periphery of the bottom plate 17. In order to prevent relative rotation between the cup 16 and the upper extremity of the sleeve 33, instruck detent bosses 36 are formed in said upper extremity, while upstruck bosses 37 are provided on the peripheries of the cup 16 and the bottom plate 17, as best shown in Fig. 1 of the drawings. These detent bosses are received in mating depressions in the gaskets 34 and 35 and relative rotation between the cup 16 and the upper extremity of the sleeve 33 which might be permitted by the gaskets 34 and 35 is prevented.

The switch 14 includes a substantially circular body 46 formed from phenolic resin or the like and is provided with a metallic cap 48 to the upper extremity of which is secured a vertically oriented tube 50. Mounted on the periphery of the tube 50 is a sleeve guide 52 which is provided with oppositely disposed, axially extending slots 54 engageable by pins 56 which are mounted in the wall of the sleeve 33.

Formed on the upper extremity of the tube 50 is a plurality of prongs 58 which serve the dual function of restraining the sleeve guide 52 against upward movement out of engagement with the tube 50 and which also serve as a seat for the lower extremity of a compression spring 62 which has its upper extremity engageable with the underside of the lowermost metallic washer 44.

Therefore, the compression spring 62 serves to bias the pickup 12 into engagement with an adjacent surface such as the underside of a cooking pot when it is placed on a heating element with which the pickup 12 is associated and the sleeve 33 is restrained against movement out of relationship with the remainder of the assembly by means of the engagement of the oppositely disposed pins 56 with their mating slots 54 in the sleeve guide 52.

A skirt 64 is mounted upon the lower extremity of the sleeve 38 to partially isolate the control switch 14 from the heat radiated from the heating element with which the top burner control 10 is associated. The control switch 14 is secured to the range of means of a bridge 68 and is provided with a centrally located, vertically oriented actuating shaft 70, said shaft having its upper extremity secured to the lower extremity of the shaft 30 by means of a coil spring 71 whose opposed ends are fastened by means of welding, or the like, to said extremities. Therefore, as the sleeve 38 moves upwardly or downwardly under the bias of the spring 62 or as urged by contact with a pot or other article imposed thereupon, respectively, the resilient connection between the upper extremity of the actuating shaft 70 of the control switch 14 and the shaft 30 of the pickup 12 permits and facilitates such movement.

Secured to the periphery of the sleeve guide 52 is an adjustment arm 72 for rotating said sleeve guide. Rotation of the sleeve guide 52 by the arm 72 causes concomitant rotation of the sleeve 33 because of the slot-pin connection 54—56 therebetween. When the sleeve 33 rotates, the cup 16 is also rotated relative to the cap 24 which is restrained against rotation by the connection to the shaft 30. In this manner, the spiral bimetallic element 21 is expanded or contracted to determine when the shaft 30 will be rotated by the action of said element. It should be pointed out that the arm 72 is associated with a scale, not shown, which indicates the various temperature levels at which the arm 72 can be set.

The control switch 14, as best shown in Fig. 6 of the drawings, includes a rotatable mounting plate 76, said plate being provided with a plurality of mounting brackets 78 upon which are secured the outer extremities of resilient thrust members 80 whose inner extremities are engageable in grooves 82 provided in the periphery of the actuating shaft 70. The peripheral edge 84 of the rotatable mounting plate 76 is located between adjacent areas of the body 46 and the cap 48 of the control switch 14 and there is provided upon the rotatable mounting plate a radially extending projection 86 which will permit the rotation of the mounting plate 76 with reference to the actuating shaft 70 to change the magnitude of the force required to rotate the shaft 70 against the bias of the resilient thrust members 80.

For a further description of the construction and mode of operation of the control switch, reference is made to United States Letters Patent No. 2,394,747 issued to me on February 12, 1946.

As indicated in the aforesaid patent, the resilient thrust members 80 tend to maintain the actuating shaft 70 in a predetermined location and will exert no thrust in a tangential direction so that the force exerted thereby will simply be an inward force due to the longitudinal compression of the resilient thrust members 80. However, when the shaft 70 is rotated by the action of the shaft 30 as induced by the bimetallic element 21, a tangential component of force will be created in the thrust members 80 and the thrust members 80 will snap over causing a snap action motion to be imparted to the shaft and to the elongated contact bar 90 mounted upon the upper extremity thereof. Thus, while the bimetallic element 21 causes the imposition of an initial torque upon the shaft 70, the snap action as imparted to the shaft 70 by the resilient thrust members 80.

In some instances, the resilient thrust members 80 may be constituted by bimetallic elements, but in other applications they can be fabricated from spring steel, beryllium copper, or the like.

There is mounted upon the lower extremity of the actuating shaft 70, as best shown in Figs. 5 and 7 of the drawings, an elongated contact member or bar 90 formed from conductive material so that the opposite ends thereof serve as oppositely disposed contacts 92, 94, 96, and 98, as best shown in Figs. 5 and 7-14 of the drawings. An elongated slot 102 is provided in the base of the body 46 and the elongated contact bar 90 is located for movement in said slot, in a manner to be described in greater detail below.

As best shown in Fig. 5 of the drawings, the contact bar 90 is mounted upon an insulator block 104 which is secured to the lower extremity of the shaft 70 and which is provided with oppositely disposed pivot pins 106 on which is pivotally mounted a rotatable bracket 108 which engages the intermediate portion of the contact bar 90. Therefore, rotation of the actuating shaft 70 as induced by rotation of the shaft 30 of the temperature-sensitive pickup 12, and as ultimately accomplished by the action of the resilient thrust members 80, is about a major axis and accomplishes bodily rotation of the contact bar 90 upon the insulator block 104. However, it will be noted that the contact bar 90 is mounted for rotation in the bracket 108 about a minor axis in a direction normal to the direction of rotation of the major axis. Thus, the major axis, that is, the axis of rotation of the actuating shaft 70, constitutes a first axis of rotation and a first sense of movement of the bar 90, while the minor axis of rotation of the bar 90 constitutes a second axis and a second sense of movement of said bar.

There is provided, as best shown in Figs. 7-13 of the drawings, on opposite sides of the slot 102 a plurality of fixed contacts 112, 114, 116, and 118, said fixed contacts all being live contacts, with the exception of the contact 118, and being engageable, respectively, by the movable contacts 92, 94, 96 and 98 on the elongated conductor bar 90. The fixed contacts 112, 114, 116, and 118 are mounted, respectively, upon terminal brackets 122, 124, 126, and 128 which are secured in the base of the body 46 of the control switch 14 and are provided with screws 130 to attach electrical leads thereto, with the exception of the bracket 128 which is a dead terminal in the present embodiment of the invention.

The fixed contact 118 is distinguishable from its associated fixed contacts in that it is constituted by an elongated stud threadedly engaged in its associated bracket 128, as best shown in Fig. 14 of the drawings, and is provided with a cavity 132 in its inner extremity to provide a receptacle for a compression spring 134 which is in constant engagement with the contiguous contact 98 on the contact bar 90 and which serves as a means for moving the contact bar 90 about its minor or second axis.

Therefore, it may be stated that the resilient thrust members 80 constitute a first means for causing rotation of the contact bar 90 about a major or first axis or in a first direction and that the compression spring 134 constitutes a second means for causing movement of the elongated contact bar 90 about its second or minor axis and in a second direction. Therefore a compound movement of the contact bar 90 is achieved because of the pivotal movement thereof in the bracket 108 and because of the provision of the second means 134 for causing said pivotal movement, in a manner to be described in greater detail below.

The contact bar 90 is, as best shown in Fig. 8 of the drawings, normally disposed by the action of the resilient thrust members 80 and the bimetallic element 21 in a normally closed position in which the movable contact 92 is engaged upon the fixed contact 112 and the movable contact 96 is engaged upon the fixed contact 116. Thus, the resilient thrust members 80 constitute first spring means for maintaining the movable contact bar 90 and a first limit of movement constituted by the fixed contact 112.

As torque is impressed upon the shaft 70 of the control switch 14 by the bimetallic element 21 when subjected to external heat and a signal is generated thereby which is transmitted to its associated shaft 30, said signal is impressed upon the actuating shaft 70 of the control switch 14 and when said signal reaches a certain magnitude, because of the increase in temperature, the resilient thrust members 80 will be induced by the rotation of the actuating shaft 70 to cause and permit the movement of the contact bar 90 to a position such as that shown in Fig. 9 of the drawings wherein the clockwise rotation of the shaft 70 is indicated by the arrow 138.

Simultaneously with the rotation of the bar 90 about its first or major axis as defined by the axis of the actuating shaft 70, there takes place rotation of the bar 90, as indicated by the arrow 140, in a direction toward the fixed contact 114 as caused by the compression spring 118. Therefore, instead of rotation of the shaft 70 as induced by the resilient thrust members 80 causing rotation of the contact bar 90 between the fixed contacts 112 and 116 as a pair and fixed contacts 114 and 118 as a pair which would be the case if the contact bar 90 were not mounted for movement about two axes and in two directions and were not provided with first and second means for causing said rotation about its first and second axes, initial rotation of the contact bar 90 about its first or major axis as induced by the actuating shaft 70 permits the compression spring 134 to rotate the contact bar 90 in the direction of the arrow 140 and to cause rotation of said contact bar between first and second positions.

Continued clockwise movement of the shaft 70, as induced by the associated bimetallic element 21 of the temperature-sensitive pickup 12, overcomes the bias of the compression spring 134 and permits movement of the contact bar 90 into the position shown in Fig. 10 of the drawings wherein the movable contacts 94 and 98 are engaged upon the fixed contacts 114 and 118, respectively, thus breaking a circuit in which the control switch 14 is inserted because of the fact that the terminal 118 with which the compression spring 134 is associated is a dead terminal.

A typical heating element circuit is schematically shown in Fig. 15 of the drawings with the control switch 14 connected in the circuit. It should be explained that in the particular heating element circuit shown there is provided a first preheater element 144 which is designed to rapidly achieve the desired temperature and a smaller maintenance element 146 connected in parallel with the preheater element 144 to the line 148. Therefore, the terminal 116 is connected to one side of the line 148, terminal 118 is dead, terminal 112 is connected to the preheater load or element, and terminal 114 is connected to the maintenance load or element 146.

As will be noted from Fig. 15 of the drawings, the preheat and maintenance circuits 144 and 146 are connected at their opposite sides to the line 148. In actual operation, the contact bar 90 maintains the movable contacts 92 and 96 of said bar in normally closed position upon the fixed contacts 112 and 116, respectively, of the control switch 14 so that when the heating element is energized the preheat load 144 will immediately bring the object placed upon the heating element to the desired temperature. When the desired temperature is reached, this is ascertained by the temperature-sensitive pickup 12 since the mercury bath 32 is heated to equally distribute and conduct the temperature throughout the bimetallic element 21 which causes rotation of the shaft 30 secured thereto and simultaneous rotation of the actuating shaft 70 of the switch 14 which then permits the resilient thrust elements 80 to rotate said shaft to cause rotation of the contact bar 90 into the position shown in Fig. 9 of the drawings and to permit the compression spring 134 to urge the conductor bar into a position wherein the movable contact 94 engages the fixed contact 114 and wherein the compression 134 will maintain the movable contact 96 in continued engagement with the fixed contact 116 so that while the preheating load 144 is dropped out of the line circuit, the maintenance load 146 which is capable of maintaining the heated object at the desired temperature will be placed in the line circuit 148 to maintain the object being heated at the desired temperature until the cooking cycle is completed.

When the cooking cycle is completed, the temperature of the heated object will increase beyond the desired norm and this temperature increase will be picked up by the temperature-sensitive pickup 12, thus imposing a torsional load on the shaft 30 which will unbalance the resilient thrust members 80 through their connection to the actuating shaft 70 and will cause the action thereof to move the contact bar 90 into the position shown in Fig. 10 of the drawings wherein the movable contacts 94 and 98 are disposed in engagement with the line contact 114 and the dead contact 118, respectively, to open the heating circuit and remove the maintenance load 146 from the line circuit 148.

If, at any time during the heating cycle the temperature of the object being heated should fall below the desired norm, this drop in temperature will be sensed by the pickup 12 and a torsional load will be impressed upon the shafts 30 and 70 which will cause the energization of the resilient thrust elements 80 and the return of the contact bar 90 to the intermediate position shown in Fig. 9 of the drawings wherein the maintenance load 146 is energized. In a like manner, should a substantial temperature drop occur, due to the adding of a substance to the object being heated, such as cold water to a sauce pan, the preheat load 144 will be placed in the line by the return of the contact bar 90 to the position shown in Fig. 8 of the drawings.

Since the compression spring 134 which constitutes the second means for causing rotation of the contact bar 90 about its second axis is adjustable, it may be so adjusted as to provide for total de-energization of the heating element by movement of the conductor bar 90 into the position shown in Fig. 10 of the drawings after the preheat cut-off and a slight drop in temperature will then be required to energize the maintenance load by returning the conductor bar 90 from the position shown in Fig. 10 of the drawings to that shown in Fig. 9 of the drawings wherein the maintenance load 146 is connected in the line 148.

An alternative heating element circuit is schematically shown in Fig. 16 of the drawings and instead of utilizing two loads, as in the previously discussed circuit, utilizes a single load or element 150 which is connected to one side 152 of a 115-volt line, the other side of the heating element 150 being connected to the fixed contact 116. Another 115-volt line 154 is connected to the contact 112 and the common conductor 156 for both lines is connected to the fixed contact 114.

Therefore, when the conductor bar 90 is disposed in the position shown in Fig. 8 of the drawings, the combined voltage of the lines 154 and 152 will be impressed upon the heating element 150 to create a preheat condition. When the desired temperature is attained and sensed by the pickup 12, rotation of the shaft to cause movement of the conductor bar 90 into the position shown in Fig. 9 of the drawings will place the fixed contacts 114 and 116 in series, thus throwing out the line 154 and cutting the voltage imposed on the element 150 in half to create a maintenance condition. Completion of the cooking cycle will cause rotation of the conductor bar 90 into the position shown in Fig. 10 of the drawings wherein the fixed contacts 114 and 118 will be engaged thereby to de-energize the control switch 14.

There is shown in Figs. 11–13 of the drawings, an alternative embodiment 164 of the control switch of my invention, said control switch 164 being substantially identical in construction to the previously discussed control switch 14, with the exception that there is provided an additional biasing means or spring 166 which is interposed between the movable contact 94 and the fixed contact 114 of the switch and which is formed from conductive material. This switch has particular application to electrical heating elements of the multi-coil type wherein the coils all contribute to preheat and only one or two of the coils is utilized during the maintenance cycle.

When the conductor bar 90 is disposed in the position shown in Fig. 11 of the drawings, the movable contacts 92 and 96 are engaged with the fixed contacts 112 and 116 and the movable contact 94 is electrically connected to the fixed contact 114 through the conductive spring 116 and both fixed contacts 112 and 114 are energized simultaneously. When the conductor bar 90 is moved into the position shown in Fig. 12 of the drawings, only the fixed contact 114 is energized and when the conductor bar 90 is moved into the position shown in Fig. 13 of the drawings, engagement of the conductor bar 90 with the dead fixed contact 118 will de-energize the switch 164.

The application of the switch 164 to multi-coil types of heating elements is graphically illustrated in Figs. 17 and 18 of the drawings, Fig. 17 showing the use of a first heater 168 and a second heater 170 in parallel therewith, both of said heaters being connected to one side of the line 172. The other side of the first heater is connected to the contact 112 while the other side of the second heater 170 is connected to the fixed contact 114, the other side of the line 172 being connected to the fixed contact 116.

Thus, when the conductor bar 90 is disposed in the position shown in Fig. 11 of the drawings, fixed contacts 112 and 114 are placed in series with fixed contact 116 to energize the first and second heaters 168 and 170 simultaneously to achieve preheat. When the desired temperature is achieved, the first heater 168 is dropped out of the line 172 by movement of the conductor bar 90 into the position shown in Fig. 12 of the drawings wherein only the fixed contact 114 is energized by engagement of the conductor bar 90 with the fixed contact 116. When the heating cycle is completed, the movement of the conductor bar 90 into the position shown in Fig. 13 of the drawings causes engagement of said conductor bar with the dead fixed contact 118 and de-energizes the switch 164.

The application of the switch 164 to control three coils of a heating element is shown in Fig. 18 of the drawings wherein first, second, and third heaters 174, 176, and 178, respectively, are connected to one leg of the line 172 in parallel with each other. The other ends of the heaters are connected as follows: the first heater 174 is connected to the normally dead contact 118 which is energized by providing for conduction through the spring 134 associated therewith, the second heater 176 is connected through the fixed contact 112, and the third heater 178 is connected to the fixed contact 114. The other side or leg of the line 172 is connected to the fixed contact 116.

Thus, when the conductor bar 90 is disposed in the position shown in Fig. 11 of the drawings, all of the heaters or coils 174 through 178 will be energized. Movement of the conductor bar 90 into the position shown in Fig. 12 of the drawings will de-energize the second heater 176 connected to the fixed contact 112 and movement of the conductor bar 90 into the position shown in Fig. 13 of the drawings will de-energize the first and third heaters 174 and 178. Of course, there are many manners in which the control switch of my invention, by virtue of its flexibility of operation, can be applied for use with heating units for electric ranges and in many other heating and control applications and it is not intended that the use of the control switches 14 and 164 be limited to the applications disclosed hereinabove.

As a matter of fact, as best shown in Figs. 19–22 of the drawings, there are numerous applications for the single-pole, triple-throw switch 14 of my invention. For instance, Fig. 19 illustrates the inter-lock operation of two heating elements 180 and 182 for a water heater, or the like. The heating elements 180 and 182 are connected at one end to one leg of a 230-volt A.C. single phase line 184, the heating element 180 being connected at its opposite end to the fixed contact 112 and the heating element 182 being connected at its opposite end to the fixed contact 114. With this circuit, simultaneous operation of the heating elements 180 and 182 is not possible, but the heating element 180 may be disposed in spaced relationship with the heating element 182 and either one energized automatically by the switch 14 as the temperature indications from the water heater dictate.

In the circuit shown in Fig. 20 of the drawings, a 230-volt line is provided and a single heater 188 is connected to one leg of said line and at its opposite end to the fixed contact 116. The other leg of the line 186 is connected to the fixed contact 112 and the fixed contact 114 is connected to ground. Therefore, the heater input is 115-volts A.C. on small temperature drop, and 230-volts A.C. on larger temperature drops.

The application of the control switch 14 to blower fan control for accomplishing two-stage blower operation is shown in Fig. 21 of the drawings wherein the switch is illustrated as having a bimetallic detector 190 associated therewith and having its respective terminals connected to the low and high speed terminals of the blower fan motor. Therefore, the control will start the low fan on temperature increase at any desired temperature and will cut off the low fan and cut on the high fan at any desired temperature. On temperature drop, the high fan cuts off and the low fan cuts on and additional temperature drop will cause the low fan to cut off.

The application of the switch 14 of my invention to high and low valve controls for a burner to accomplish two-stage operation thereof is illustrated in Fig. 22 of the drawings, high and low valves being placed in parallel in the fuel line and being electrically controlled by the switch 14 which has a bimetallic detector 190 connected thereto. Of course, it should be understood that, as disclosed in my above referenced application, the resilient thrust elements 80 can be created from bimetallic material and serve as detectors, in addition to performing their thrust function.

I thus provide by my invention a temperature detecting means which is associated with a control switch adapted to achieve single-pole, triple-throw operation and thus to permit multi-stage control with a single switch of a plurality of electrical or other types of units and which is also capable of achieving multi-stage operation of a single unit.

I claim as my invention:

1. In an electrical control device, the combination of: a contact member rotatable about first and second intersecting axes; first means for rotating said contact member about said first axis; second means for rotating said contact member about said second axis during rotation of said member by said first means about said first axis; a first pair of contacts engageable by said contact member as rotated by said first means; a second pair of contacts engageable by said contact member when rotated by said first and second means; and a third set of contacts engageable by said contact member when said first means continues rotation of said member after rotation thereof by said second means.

2. In a contact assembly, the combination of: a contact member movable about a first axis between first and second extremes of movement and about a second axis intersecting said first axis between first and second positions; first means for moving said member about said first axis between said first and second extremes; second means for moving said member about said second axis between said first and second positions during movement of said member by said first means; and first and second sets of contacts successively engageable by said contact member when respectively moved by said first and second means.

3. In a contact assembly, the combination of: a contact member movable about a first axis between first and second extremes of movement and about a second axis intersecting said first axis between first and second positions; first spring means for moving said member about said first axis between said first and second extremes; second spring means for moving said member about said second axis between said first and second positions during movement of said member by said first means; and first and second sets of contacts successively engageable by said contact member when respectively moved by said first and second means.

4. In an electrical contact assembly, the combination of: a contact bar mounted on a shaft for simultaneous rotation about first and second intersecting axes; first spring means engageable with said shaft for rotating said bar about said first axis; second spring means engageable with said bar for rotating said bar about said second axis; and first and second sets of contacts successively engageable by said bar when respectively moved by said first and second means.

5. In a temperature control responsive to the temperature of an object being heated to control a heating source, the combination of: a temperature responsive pickup; an electrical control device operatively connected to said pickup, said control device including a contact bar movable about first and second intersecting axes, first and second means for simultaneously moving said bar about said first and second axes, and a plurality of contacts engageable by said contact bar; and an electrical circuit connected to said control device including first and second heating circuits energizable by said control device.

6. In a temperature control responsive to the temperature of an object being heated to control a heating source, the combination of: a temperature responsive pickup disposable in heat transfer relation with said object; an electrical control device operatively connected to said pickup, said control device including a contact bar movable about first and second axes perpendicular to and intersecting each other, first and second means for simultaneously moving said bar about said first and second axes, and a plurality of contacts engageable by said contact bar; and an electrical circuit connected to said control device including first and second heating circuits energizable by said control device.

References Cited in the file of this patent

UNITED STATES PATENTS

| | | |
|---|---|---|
| 1,004,005 | Ferguson | Sept. 26, 1911 |
| 2,360,128 | Hausler | Oct. 10, 1944 |
| 2,376,091 | Shaw | May 15, 1945 |
| 2,394,747 | Campbell | Feb. 12, 1946 |
| 2,487,037 | Smith | Nov. 1, 1949 |
| 2,804,527 | Snyder et al. | Aug. 27, 1957 |